No. 896,597. PATENTED AUG. 18, 1908.
J. A. SWENSON.
INCUBATOR.
APPLICATION FILED MAY 31, 1907.
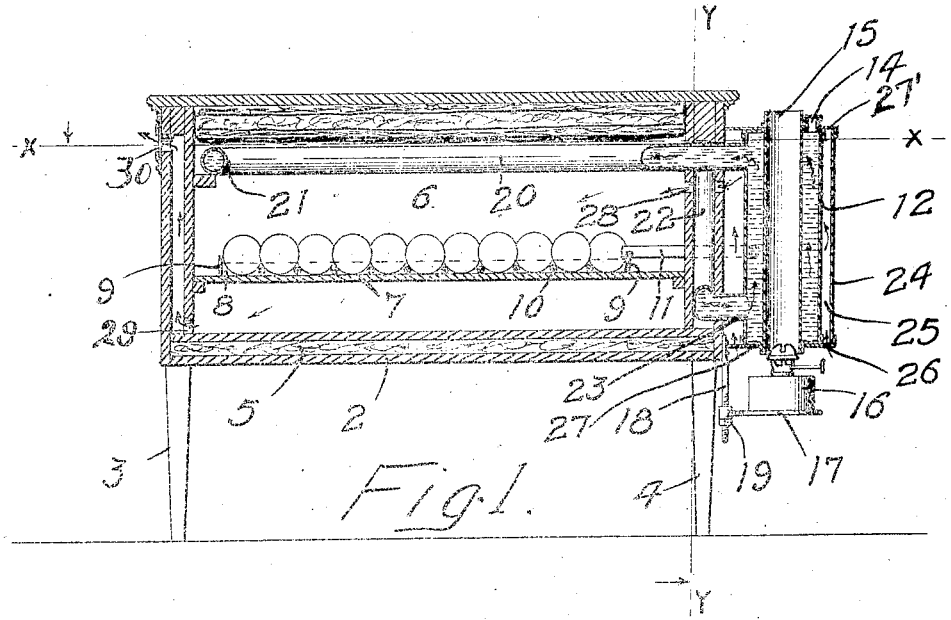
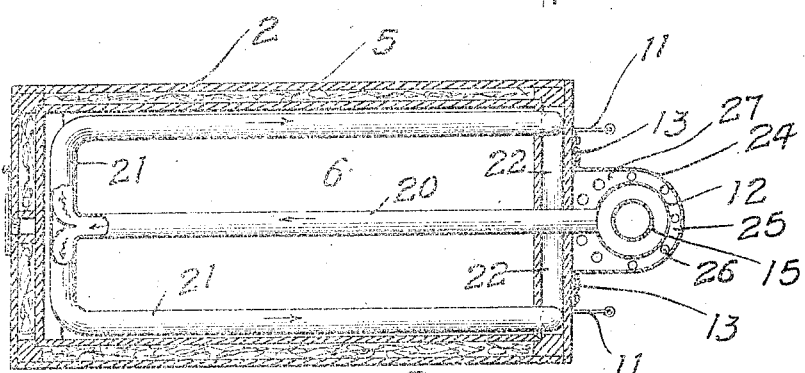
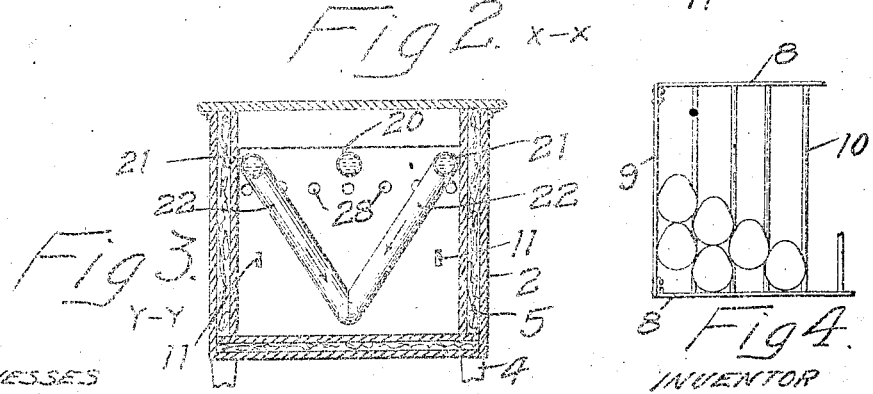
WITNESSES
INVENTOR
JOEL A. SWENSON
BY
HIS ATTORNEYS

UNITED STATES PATENT OFFICE.

JOEL A. SWENSON, OF MINNEAPOLIS, MINNESOTA.

INCUBATOR.

No. 896,597.  Specification of Letters Patent.  Patented Aug. 18, 1908.

Application filed May 31, 1907. Serial No. 376,624.

*To all whom it may concern:*

Be it known that I, JOEL A. SWENSON, of Minneapolis, Hennepin county, Minnesota, have invented certain new and useful Improvements in Incubators, of which the following is a specification.

The object of my invention is to provide an improved hot water heating system for incubators whereby a larger volume of water can be circulated through the incubator and a more uniform heat obtained.

A further object is to provide improved means for turning the eggs without opening the incubator.

In the accompanying drawings, forming part of this specification, Figure 1 is a longitudinal vertical sectional view of an incubator embodying my invention. Fig. 2 is a horizontal sectional view on the line $x$—$x$ of Fig. 1. Fig. 3 is a vertical transverse sectional view on the line $y$—$y$ of Fig. 1. Fig. 4 is a detail view of the tray or rack on which the eggs are placed.

In the drawings, 2 represents the outer casing of the machine supported upon the legs 3 and 4, the inner walls spaced from the outer walls in the usual way and having sheets of asbestos 5 or other suitable non-heat-conducting material arranged between the inner and outer walls for the purpose of confining the heat in the egg chamber. This chamber, which I will designate by the reference numeral 6, contains an egg tray 7 on which the eggs are placed in rows. Upon the tray I arrange a rack consisting of side bars 8 connected with one another at each end of the egg tray by cross bars 9 and also connected at intervals between said cross bars by narrow strips 10, preferably of metal, which extend between the cross rows of eggs and contact with the lower portion thereof, so that when the bars 8 are moved lengthwise on said tray the eggs will be rolled thereon and turned completely over. As indicated in Fig. 1 a sufficient space is left on the tray at the ends of the rack to allow for the turning of the eggs. Hand pieces 11 extend through the end of the incubator and have notched ends to engage the cross bar 9 so that the operator can grasp the outer ends of the hand pieces and move the rack back and forth on the egg tray. The rack is removable through the usual side door of the incubator which I have not illustrated herein. The cross bars 9 sliding in the notches of the hand pieces 11 permit such removal.

For the purpose of heating the egg chamber I provide a drum 12 having a filling opening 14 through which a supply of water may be poured into the drum. A pipe 15 is open at each end and extends entirely through the drum, and beneath the open end of the pipe 10 I arrange a heating lamp 16 supported on a shelf 17 that is vertically adjustable on a rod 18 by means of a nut 19 fitting on the threaded lower end of said rod. The pipe 15 is entirely surrounded by the water in the drum and a circulating pipe 20 leads from the top of the drum and extends through the upper portion of the egg chamber to the opposite end of the incubator. At this point pipes 21 branch laterally from each side of the pipe 20 and extend to the side walls of the incubator and from thence parallel with one another along the top of the egg chamber and at the end of said chamber contiguous to the heating drum the said pipes 21 pass through the inner wall of the chamber, and pipes 22 extend downwardly from the pipes 21 and converge toward one another and unite near the bottom of the egg chamber and have a branch pipe 23 which extends through the outer wall of the casing and into the lower portion of the heating drum 12. The water in the drum heated by the lamp will rise to the top of the drum and flow out through the pipe 20 along the middle of the egg chamber and then out to the sides of the chamber and back through the pipes 21 also in the top of the egg chamber and finally flow down through the inclined pipes 22 into the lower portion of the heating drum. In this way a complete and rapid circulation is maintained throughout the air chamber and a uniform temperature is established over and around the eggs.

I prefer to provide a shell or casing 24 slidably supported between guides 13 and the wall of the incubator and inclosing the heating drum 12, a space 25 being formed between them. Plates 27 and 27' close the space between the shell 24 and the drum 12 and the plate 27 has a series of holes 26 therein through which fresh air is admitted into the space between the drum and the casing and this air after circulating around the drum passes through the holes 28 into the egg chamber. In the wall of the egg chamber opposite from the end where the heating drum is located, I provide a ventilating hole 29 through which the foul air in the bottom of the egg chamber is allowed to escape and pass up between the inner and outer walls of the chamber and through the hole 30 to the open air.

I claim as my invention:

1. An incubator comprising a casing having an egg chamber, a drum adapted to contain water, supported outside said casing, a shell inclosing said drum and spaced from the walls thereof, said shell having a series of perforations in its lower end through which cold air is admitted into the space between said shell and drum and said casing having holes leading into said egg chamber and communicating with the space between said shell and drum, a pipe open at each end extending vertically from said drum, a heating means provided beneath the open lower end of said pipe and circulating pipes extending through said egg chamber and connected with said drum said circulating pipes comprising a supply pipe leading from the upper end of said drum horizontally through the top of the egg chamber, and return pipes in substantially the same plane as said supply pipe and provided with a V-shaped extension which communicates with the lower portion of said drum.

2. An incubator comprising a casing having an egg chamber, a heating drum supported outside said casing and adapted to contain a supply of water, a single pipe connected with the upper portion of said drum and extending horizontally through a wall of the casing and lengthwise of said egg chamber in the upper portion thereof, said pipe having laterally turned ends and horizontal pipes attached to said ends and extending horizontally and parallel with said first named pipe to the end of said casing contiguous to said drum, depending pipes attached to the ends of said last named pipes and having their lower ends united, forming a V-shaped section and a short pipe section communicating with the apex portion of said V-section and extending through the wall of said casing into the lower portion of said drum whereby a complete circulation of the water through said egg chamber will be obtained.

In witness whereof, I have hereunto set my hand this 29th day of May, 1907.

JOEL A. SWENSON.

Witnesses:
J. B. ERA,
I. M. PYATT.